July 31, 1962 C. F. MITTENZWEI 3,047,263
BRACKET
Filed Jan. 18, 1960
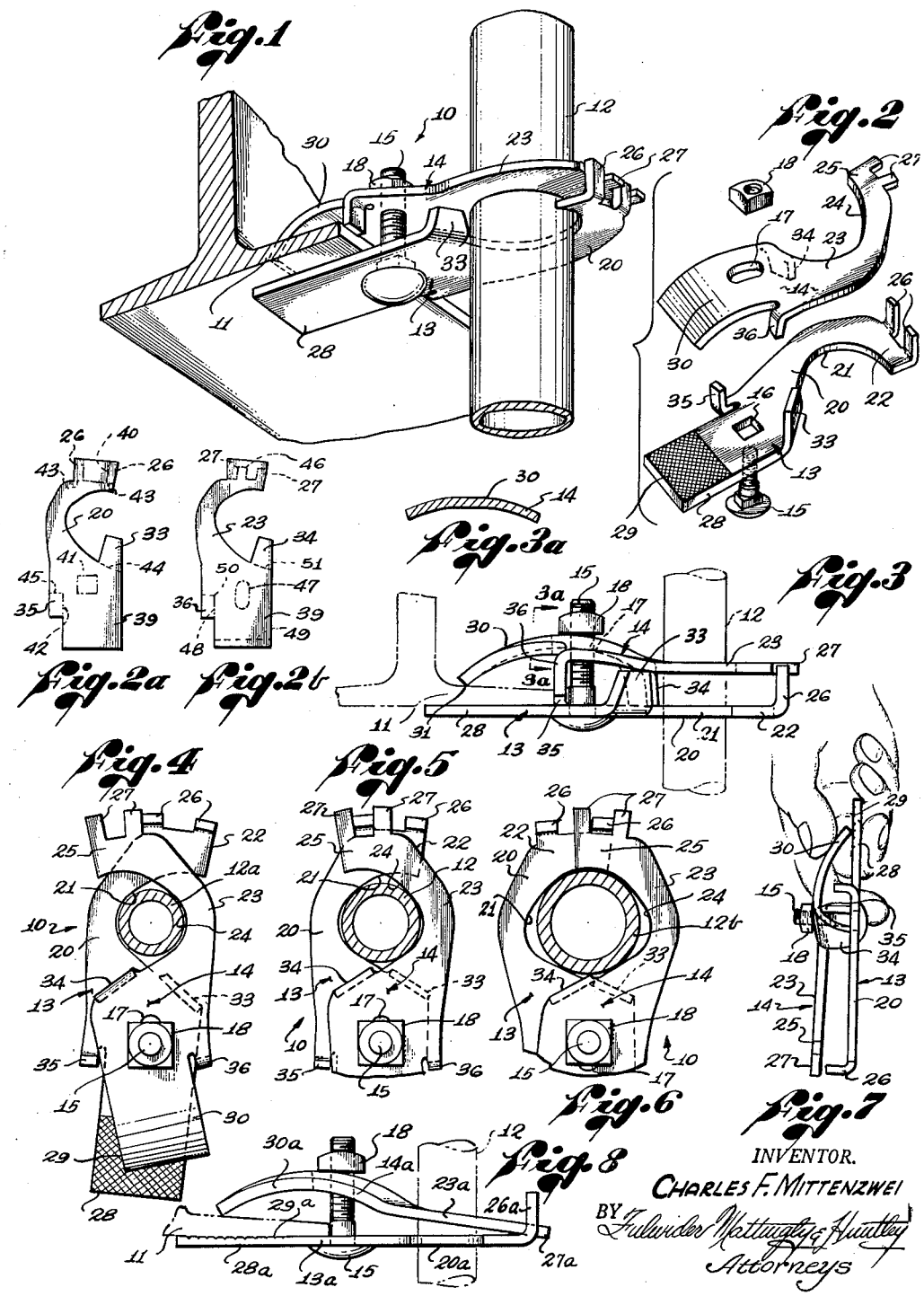
INVENTOR.
CHARLES F. MITTENZWEI
BY Fulwider Mattingly & Huntley
Attorneys United States Patent Office 3,047,263
Patented July 31, 1962

3,047,263
BRACKET
Charles F. Mittenzwei, 4811 Edgewood Place,
Los Angeles 19, Calif.
Filed Jan. 18, 1960, Ser. No. 3,109
13 Claims. (Cl. 248—72)

This invention relates generally to mounting devices used in building construction and more particularly to an improved attachment bracket or support for holding element such as conduits on structural members.

Devices incorporating the principles of the present invention may be used in many different environments but the most wide spread use of such supports is in the construction of steel frame buildings. After the frame work of such buildings has been fabricated and erected it is usual practice to install the conduits which carry water, gas, and electrical power to the various parts of the building. These conduits are attached to the frame at a great many places and, therefore, the brackets for this purpose should not only attach the conduits to the structural members securely, but should be light and inexpensive.

The variation in the sizes of the conduits makes it desirable that a single sized bracket be capable of adjustment to handle a variety of conduit sizes thus enabling the contractor to operate with a smaller inventory with corresponding savings in costs. Such characteristics also achieve substantial savings in time because the workmen need not carry as many supports around in order to have the proper size available, when needed.

As construction workmen quite often perform their tasks on elevated beams and other precarious locations, the ideal bracket should not only be capable of being positioned rapidly on the conduit and structural member, but it should be fabricated to enable a workman to locate it on the conduit without the use of both hands, leaving his other hand free to steady himself.

With the needs of the industry such as those mentioned above in mind, it is a major object of this invention to provide a simple and quick acting bracket for mounting conduits and similar elements on other structural parts.

Another object of this invention is to provide a low cost device of the type described which may be located in position with one hand.

A still further object of this invention is to provide a simple bracket which may be easily adapted to fit several different size conduits to mount such conduits on a structural unit.

Still another object of this invention is to provide a support which will securely grip a structural member for attaching elements to it.

An additional object of this invention is to provide a lightweight, inexpensive bracket for mounting conduits on structural members.

Other and further objects of this invention will become apparent in the detailed discussion below when considered in conjunction with the attached drawings wherein:

FIGURE 1 is a pictorial view of a bracket incorporating the principles of this invention, the same being shown clamped to a structural member to secure a conduit thereto;

FIGURE 2 is an exploded view of the bracket shown in FIGURE 1;

FIGURE 2a is a plan view of a blank from which one member of the bracket shown in FIGURE 1 is made;

FIGURE 2b is a plan view of a blank from which the other member of the bracket shown in FIGURE 1 is made;

FIGURE 3 is an elevational view of the bracket as shown in FIGURE 1;

FIGURE 3a is a cross-sectional view along line 3a—3a in FIGURE 3;

FIGURES 4 through 6 are plan views of the bracket as shown in FIGURE 1, illustrating how it may be adjusted to various sizes of pipe or conduit;

FIGURE 7 is a side view showing how the bracket may be adjusted with one hand; and FIGURE 8 is an illustration of a second form which the present invention might take.

Referring now to FIGURE 1, a bracket indicated generally by the reference character 10 and incorporating the principles of the present invention, is shown attached to a flange 11 of a structural member which, in this case, is an I beam. For purposes of illustrating the operation of the present invention, a vertical conduit 12 is shown encircled and held by curved arms of the bracket 10.

In FIGURE 2, the details of the bracket 10 may be seen. In its presently preferred form, the bracket comprises first and second elongated generally planar members 13 and 14 which are swingably held together in scissors-like relation by a bolt 15 and nut 18. The thread of the bolt 15 is deformed at the upper end, since there is no need to remove nut 18, when the bracket is used. The bolt 15 is secured to the first member 13 by a press fit into a square aperture 16 in this member, thereby becoming in effect an integral part of the first member. The second member 14 is secured to the first by the bolt 15 received in an opening 17 in the member. The opening 17 is elongated to permit transverse movement of the member 14 on the bolt 15.

In order to encircle the conduit to be held, each of the members 13 and 14 is provided with a curved arm or hook; said arms being located in opposed relation to form an opening in which the conduit is received. Therefore, the member 13 is provided with a C-shaped curved arm or hook 20 which forms a re-entrant surface 21 and has a free end 22. The second member 14 is similarly shaped with a C-shaped curved arm or hook 23 forming a re-entrant surface 24 and a free end 25. Thus, it may be seen that by swinging the second member 14 relative to the first member 13, the opening formed by the two curved arms 20 and 23, respectively, may be varied to handle different size pipes, conduits, or other elements.

The particular embodiment of the invention shown is adjustable to handle three sizes of conduit. To this end, interengaging means take the form of a pair of fingers 26 which are bent up from the free end 22 of one member and cooperate with a pair of projections 27 on the free end 25 of the other member, as illustrated in FIGURES 3, 4, 5, and 6. In FIGURE 4, the bracket 10 encircles a small pipe 12a and, therefore, the member 14 has been so assembled with first member 13 that the right hand projection 27 cooperates with the left hand finger 26 to hold the members 13 and 14 in this position encircling the pipe. In FIGURE 5, where the bracket 10 encircles a medium size pipe 12, the left hand finger 26 is located in the slot between the projections 27 to hold the members 13 and 14 in the position desired. Similarly, as shown in FIGURE 6, when a large pipe such as 12b, is to be held, the members 13 and 14 are oriented so that the right hand finger 26 is received in the slot between the projections 27.

Having described the manner in which the particular conduit is held by the bracket 10, I now turn to the means by which the bracket is secured to the flange 11 of a frame member.

Integrally adjoining the arm 20 of the first member 13, is a flat first jaw 28 which has its inner face knurled at 29. Opposite the jaw 28 is a second integrally formed jaw 30 on the second member 14 and which may be moved towards the jaw 28 by tightening the nut 18 to grip the flange 11 between the two jaws.

As can be seen in FIGURES 3, 3a, the jaw 30 has been domed by being curved in two directions to strengthen it. By reason of the domed shape only the terminal edge 31 on the jaw 30 engages the flange 11 irrespective of its thickness. This enables the bracket 10 to be attached to flanges of varying thicknesses.

The dome shape of jaw 30 also has the advantage that the jaw may be sprung slightly as the nut 18 is tightened. As can also be seen in FIGURE 3 by the dashed lines, the oval opening 17 is not at the highest point on the jaw 30 and therefore, only one side of the nut 18 engages the jaw as the nut is tightened. With this arrangement, the nut 18 when tightened is canted on the bolt 15 effectively locking the nut in that position and preventing it from being loosened by vibration.

Located on the first member 13 adjacent the portion where the re-entrant surface 21 adjoins the jaw 28 is a fulcrum tab 33 which is bent up so that its edge engages the opposed face of the second member 14 near the point where the jaw 30 adjoins the arm 23. A correlative fulcrum tab 34 is formed on the second member 14 and engages the upper face of the first member 13 where the jaw 28 adjoins the arm 20.

The fulcrum tabs 33 and 34 are so located that they cooperate to perform two important functions. First, as illustrated in FIGURE 3, the members 13 and 14 pivot relative to each other around the fulcrum tabs 33 and 34 as the nut is tightened on the bolt 15. Therefore, there is less tendency for the members 13 and 14 to bend since the positions of these members which are subjected to bending stresses, i.e. the jaws 28 and 30, are relatively short. Further, as illustrated in FIGURES 4, 5, and 6, the tabs 33 and 34 provide a relatively wide fulcrum which resists any tendency of the two members 13 and 14 to twist relative to each other.

Referring now to FIGURE 7, a second important function of the tabs 33 and 34 is that they space the first and second members 13 and 14 apart sufficiently so that the curved arms 20 and 23 may be easily rotated apart with one hand in order to be located around a conduit. More specifically, when it is desired to apply the bracket 10, the worker wraps his middle finger partially around the jaw 28 and uses his index finger to help support the first member 13. Then, by pushing the jaw with his thumb so that the edge 31 rides against the surface of the jaw 28, the member 14 is pivoted sufficiently that the projections 27 are displaced away from the ends of the fingers 26, as shown. At this time (as seen from the top), the workman may rotate the curved arm 23 to the right to open the curved arms 23 and 20 by pushing the jaw 30 with his thumb to the left relative to the jaw 28. The oval opening 17 is sufficiently large to allow the tab 34 to pass on the side of the tab 33 which faces the fingers 26. Then, after the bracket 10 has been located around the conduit, the workman may rotate the curved arms 20 and 23 back to the closed position by manipulating his thumb in the reversed direction. Therefore, it may be seen that the bracket 10 only requires one hand to be used to quickly locate it around the desired conduit.

Also formed on the members 13 and 14 are stops 35 and 36, respectively, each of which is bent toward the opposed member, as shown. As shown in FIGURE 3, the stops 35 and 36 engage the edge of the flange 11 preventing the bracket 10 from swinging from side to side in the plane of the flange 11. The stops 35 and 36 have the additional function of limiting the amount that the members 13 and 14 may be rotated relative to each other. More particularly, viewing the bracket 10 from the top, the amount that the member 14 may be rotated counterclockwise is limited by the tab 34 coming into contact with the stop 35 and the stop 36 coming into contact with the tab 33.

In practice, the bracket 10 is used in the following manner. First, the bracket is located around the conduit in the manner described in conjunction with FIGURE 7 using only one hand. Then, the worker uses the same hand to locate the projections 27 in proper relation to the fingers 26 according to the size of conduit encircled, after which the jaws 28 and 30 are located around the flange 11. Then, the worker tightens the nut 18 causing the jaws 28 and 30 to firmly grip the flange 11. As illustrated in FIGURE 3, the thickness of the flange 11 prevents the jaw 30 from being moved close enough to the jaw 28 to disengage the projections 27 from the fingers 26.

Thus, it may be seen that because of the dimensions and locations of the bolt 15, the fulcrum tabs 33 and 34, the fingers 26 and projections 27, relative to each other, the bracket 10 has the following attributes. It may be varied to support anyone of several size conduits without disassembly and can be located thereon with the use of only one hand. Further, it can be adjusted to be secured to flanges of many different thicknesses, and the bracket is locked around the conduit, while attached to the flange.

The advantages of my invention lie not only in the versatility and ease of use of embodiments thereof, such as bracket 10, but also in the economical manner in which such embodiments may be produced. Only a punch press is needed to manufacture the bracket 10. Furthermore, the first and second members 13 and 14 are so similar to each other that the same blanking die may be used in their production. As illustrated in FIGURES 2a and 2b, blanks 39 have the same shapes as shown by the solid outline. Then the blanks 39 are shaped further to produce the individual characteristics of members 13 and 14 with little scrap.

Referring now to FIGURE 2a in particular, the further steps necessary to produce a first member 13 will be described. With a second die, the blank 39 is punched along phantom line 40 to form the fingers 26 and along phantom line 41 to form the square aperture 16, as well as along phantom line 42 to outline the stop 35. Then, the blank is transferred to a third die which simultaneously bends the fingers 26, tab 33, and stop 35 upwardly along dashed lines 43, 44, and 45, respectively.

Referring now to FIGURE 2b, the second member 14 is formed from the blank 39 by punching the blank along phantom line 46 to form the projections 27, as well as along phantom line 47 to produce the oval opening 17. Then, the stop 36 is formed by cutting the blank along phantom line 48 and the blank 39 is shortened by trimming off the end along phantom line 49. The blank 39 as thus formed is transferred to another die which simultaneously bends the stop 36 and the tab 34 up along dash lines 50 and 51, respectively, and domes the jaw 30 by curving it in two directions.

FIGURE 8 shows an alternate embodiment of my invention which is useful where the requirements are not so stringent. This bracket has first and second members which are very similar to the first and second members 13 and 14 and, therefore, are designated as 13a and 14a, respectively. As in the first embodiment, this bracket uses cooperating fingers 26a and projections 27a to enable it to hold a variety of sizes of conduits. However, it will be noted that the members 13a and 14a differ from the members 13 and 14 in that no fulcrum tabs, such as 33 and 34 are provided, nor are stops, such as 35 and 36 used.

Similarly, the first form of the invention, arms 20a and 23a of the members 13a and 14a are swung apart to receive and hold the conduit 12. Then, after positioning the fingers 26a and projections 27a as desired, the bracket is located on the flange 11. Then, nut 18 is tightened, pivoting the members 13a and 14a about the fulcrum on the arms at the point where the fingers 26a and the projections 27a are formed, and clamping the jaws 28a and 30a onto the flange 11.

Although two forms of the present invention have been shown and described in detail, it will be apparent to those skilled in the art that such is by way of illustration only and that numerous changes and modifications may be made without departing from the spirit of the present invention. Therefore, it is my intention that the invention be limited only by the scope of the appended claims.

I claim:

1. A bracket comprising: a first generally planar member having a jaw and a hook adjoining each other; a pair of fingers extending from said hook; a bolt secured to said jaw and extending generally normal to the plane of said member; a second member adjacent said first member, said second member having a jaw and a hook adjoining each other, the jaw of said second member being domed by being curved in two directions, the surface of said jaw which is remote from said first member being convex, an oval opening formed in said domed jaw, said second member being swingably connected to said first member by receiving said bolt through said oval opening, said hook on said second member facing opposite the hook on said first member, a pair of projections on said second member adapted to be located in engagement with said fingers when said first and second members are in position in which said hooks form an opening to receive a rod-like member to be supported; and a nut threaded on said bolt to move the jaws together, said oval opening being positioned so that only one edge of said nut is engaged by the convex surface of said domed jaw.

2. A bracket comprising: first and second opposed members swingably connected together, each of said members having an adjoining jaw and curved arm; fulcrum means spacing said members apart; a finger extending from a position on the curved arm on said first member; a projection extending from the curved arm of said second member; said projection being located so as to engage said finger only when the members are swung relative to each other with the jaws spaced apart and serving to limit the relative opening movement of said curved arms so as to embrace an object therebetween; and means to positively move said members about said fulcrum means to clamp said jaws together, said fulcrum means being located on the side of said moving means remote from said jaws.

3. Means to hold a component on a structural flange comprising: first and second opposed generally planar members connected together to swing about a first axis which extends normal to the plane of said first member, said first and second members each having an adjoining jaw and curved arm at opposite ends thereof with a fulcrum tab located therebetween, said curved arms being curved in opposite directions and generally at right angles to the axis of swing of the two members, said fulcrum tabs each extending toward the opposed member and spacing the members apart and aligned substantially transversely of the members; and means to move said jaws together in a direction generally parallel to the axis of swing of the members to grip a structural flange on which the component encircled by said arms is to be hung.

4. The invention as defined in claim 3 wherein: said jaw on said second member is domed by being bent in two directions and provides a convex surface facing away from the first member; an oval opening is formed through the dome; a bolt secured to said first member extends normally to the plane of said first member through said oval opening; and a nut is threaded on said bolt for clamping the jaws together, said opening positioned in the dome so that said nut is engaged by said second jaw on only one side.

5. A bracket comprising: a first and a second member swingably connected together, each of said members having a curved arm forming a re-entrant surface and a jaw adjoining the arm, said arms being in opposed relation whereby the arms may be located around a component, such as a conduit, by swinging the members relative to each other; a fulcrum tab extending from each member at the point where the particular re-entrant surface adjoins the respective jaw, said fulcrum tabs on each member extending toward and engaging the other member thereby spacing said members and being aligned substantially transversely of said members; means to pivot said members around said fulcrum tabs to clamp said jaws together to grip a structural member between them and interengaging means on said members for adjustably holding said arms in any of a plurality of opening limited positions to closely embrace components of different sizes.

6. A bracket to be attached to the edge of a structural flange, said bracket comprising: first and second members, each having a jaw and a curved arm which forms a re-entrant surface adjoining the jaw, said members being swingably connected together with the curved arms in opposed relation whereby the arms may be swung away from each other to receive a component within the arms and then swung back together to form an opening through which such element extends, a fulcrum tab extending from each member at the portion where the respective re-entrant surface adjoins the respective jaw, the tabs on each member extending toward the other member and engaging that member at the portion where the curved arm adjoins the jaw of that member, said tabs being aligned substantially transversely of said members; stop means other than said arms on at least one of said members for engaging said edge of the flange and stabilizing the bracket when attached; means engaging said jaws to clamp the jaws together; and means on said members for holding the arms in position when they are swung together.

7. A bracket comprising: a first generally planar member having a first hook adjoining a first jaw, said hook forming a re-entrant surface, a finger extending from the end of the said hook which is remote from the jaw, a first fulcrum tab struck up from the member at the portion where said re-entrant surface adjoins said jaw; a bolt secured to said member, said bolt extending normally to the plane of the said first member; a second member adjacent said first member, said second member having a second hook with a re-entrant surface and a second jaw adjoining said second hook, said second hook facing said first hook whereby they may cooperate to encircle a conduit; a projection on said second hook adapted to be located in engagement with said finger to prevent said first hook from being rotated relative to said second hook in a direction to open the hooks; said second jaw being domed by being curved in two directions and having an elongated aperture therethrough near the center thereof receiving said bolt, a second fulcrum tab struck up from said second member at the portion where said second jaw adjoins the respective re-entrant surface; said first and second fulcrum tabs being bent toward and engaging the second and first members, respectively, each tab engaging the correlated portion on the adjacent member at which the respective jaw adjoins the respective hooks; and means cooperating with said bolt to move said jaws together by pivoting the members about a fulcrum formed by said tabs.

8. A bracket for attaching a rod-like object to structural members of varied thickness comprising: first and second members each having a clamping jaw and an object receiving arm, adjustable pivotal means connecting said members by extending from said first member through an elongated opening in said second member; said elongated opening having its long axis substantially coincident with the long axis of said second member and being so proportional and positioned with respect to said members and said pivotal means that an acute angular relationship is obtainable between the plane of said second member and the axis of the pivotal means; means for limiting the relative opening movement of said arms; and means located on the side of said pivotal means remote from said jaws providing a fulcrum about which said second member pivots to accommodate structural members of varied thickness between said jaws.

9. A bracket for attaching a rod-like object to a structural flange, comprising: two opposed members each having a flange clamping jaw and an object receiving arm, said opposed members being connected by adjustable pivotal means extending from one opposed member through an elongated opening in the other opposed member, said members being spaced apart by fulcrum tabs extending from each member toward the opposite member and engaging thereon to space the members apart, said tabs being normally in alignment transversely of said members, said pivotal means and elongated opening engagement providing for displacement of said fulcrum tabs longitudinally of said members, thereby allowing the tabs to clear each other so that the receiving arms may be opened to embrace an object without disassembly of the bracket.

10. A bracket for attaching any one of several distinct sizes of a rod-like object to a structural member comprising: first and second members each having a clamping jaw and an object receiving arm; means for pivotally connecting said members with said clamping jaws opposed; interlocking means on the receiving arm of said first member spaced from said pivotal connection; interlocking means on the receiving arm of said second member located so as to mechanically engage with the interlocking means on said first member when said receiving arms are adjusted to any one of several predetermined positions, said engagement occurring only when the members are swung relative to each other with the clamping jaws spaced apart, said pivotal means including means for moving said jaws toward each other in clamping relation with a structural member to thereby lock the bracket on the structural member and the receiving arms in a selected object receiving position.

11. A bracket for attaching any one of several distinct sizes of a rod-like object to a structural member comprising: first and second members each having a clamping jaw and an object receiving arm; pivotal means connecting said members in swingable relation; fulcrum means spacing said members apart; a pair of fingers on the receiving arm of said first member spaced from said pivotal means; and a pair of projections on the receiving arm of said second member located so as to mechanically engage with said fingers when said receiving arms are adjusted to any one of several predetermined positions, said engagement occurring only when the members are swung relative to each other with the clamping jaws spaced apart, said pivotal means including adjustable means for pivoting said members about said fulcrum means to clamp said jaws together on a structural member, thereby also locking said mechanically engaged receiving arms in a selected position.

12. A bracket for attaching any one of several distinct sizes of a rod-like object to a structural member comprising: first and second members each having a clamping jaw and an object receiving arm; pivotal means connecting said members in swingable relation, fulcrum means spacing said members apart; a pair of fingers on the receiving arm of said first member spaced from said pivotal means; and a pair of projections on the receiving arm of said second member located so as to mechanically engage with said fingers when said receiving arms are adjusted to any one of several predetermined positions, said engagement occurring only when the members are swung relative to each other with the clamping jaws spaced apart, said pivotal means including adjustable means for pivoting said members about said fulcrum means to clamp said jaws together on a structural member, said fingers extending toward said second member a substantial distance to maintain said fingers and projections in mechanically engaged relation to lock said receiving arms in a selected position independent of variations in the clamping positions of said jaws.

13. A bracket for attaching any one of several distinct sizes of a rod-like object to a structural member comprising: first and second members each having a clamping jaw and an object receiving arm thereon; means for connecting said members together for relative swinging movement substantially parallel to the planes thereof to move said object receiving arms toward and away from each other and for relative swinging movement in a plane substantially at right angles to the planes of said members to move said clamping jaws into clamping relation; interengaging means on said arms remote from said connecting means and adjustable to provide for a plurality of mechanically limited positions of said receiving arms to accommodate objects of varied sizes, said connecting means including means for urging said jaws together into clamping relation with a structural member with said interengaging means locking said receiving arms in an adjusted position, said interengaging means being moved out of interengaging relation when said clamping jaws are moved together so as to permit swinging movement of the members and receiving arms to embrace an object between the arms, separation of said jaws thereafter moving said interengaging means into interengaging relation to lock said receiving arms in an adjusted position.

References Cited in the file of this patent

UNITED STATES PATENTS

| | | |
|---|---|---|
| 493,216 | Louden | Mar. 7, 1893 |
| 1,820,229 | Korns | Aug. 25, 1931 |

FOREIGN PATENTS

| | | |
|---|---|---|
| 257,988 | Germany | Mar. 26, 1913 |
| 509,529 | Germany | Oct. 9, 1930 |